July 30, 1935.  J. P. TAYLOR  2,009,532
MOVING PICTURE FILM FIRE ELIMINATOR
Filed Aug. 30, 1933  2 Sheets-Sheet 1

Inventor
J. P. Taylor
By Clarence A. O'Brien
Attorney

July 30, 1935.  J. P. TAYLOR  2,009,532
MOVING PICTURE FILM FIRE ELIMINATOR
Filed Aug. 30, 1933    2 Sheets-Sheet 2

Inventor
J. P. Taylor

By *Clarence A. O'Brien*
Attorney

Patented July 30, 1935

2,009,532

UNITED STATES PATENT OFFICE 2,009,532

MOVING PICTURE FILM FIRE ELIMINATOR

Joe P. Taylor, La Porte, Tex.

Application August 30, 1933, Serial No. 687,502

2 Claims. (Cl. 88—17)

This invention is a device for eliminating the possibility of moving picture film catching fire when the film breaks, sprocket holes tear out, or when for any other reason the film fails to feed in the proper manner.

The invention consists in the provision of a device of the character above mentioned which is controlled by the movement of the film so that as long as the film is moving in the proper manner the shutter will remain open, and when the film stops moving properly for any reason the device ceases to hold the fire shutter open and it is closed by gravity. In other words the fire shutter is moved to a closing position by gravity with respect to the film opening in the aperture of the projector to thereby shut off the projector light from the film and eliminate possibilities of the projecting light setting fire to the film.

Further it is an object of the present invention to provide hangers or brackets suitable for mounting the above mentioned device on any moving picture machine at any convenient place, between the top sprocket and the intermittent sprocket thereof, and preferably on the top of the gate or door on a Power's machine.

The invention together with its objects and advantages will be best understood from a study of the following description taken in connection with the accompanying drawings wherein.

Figure 1:
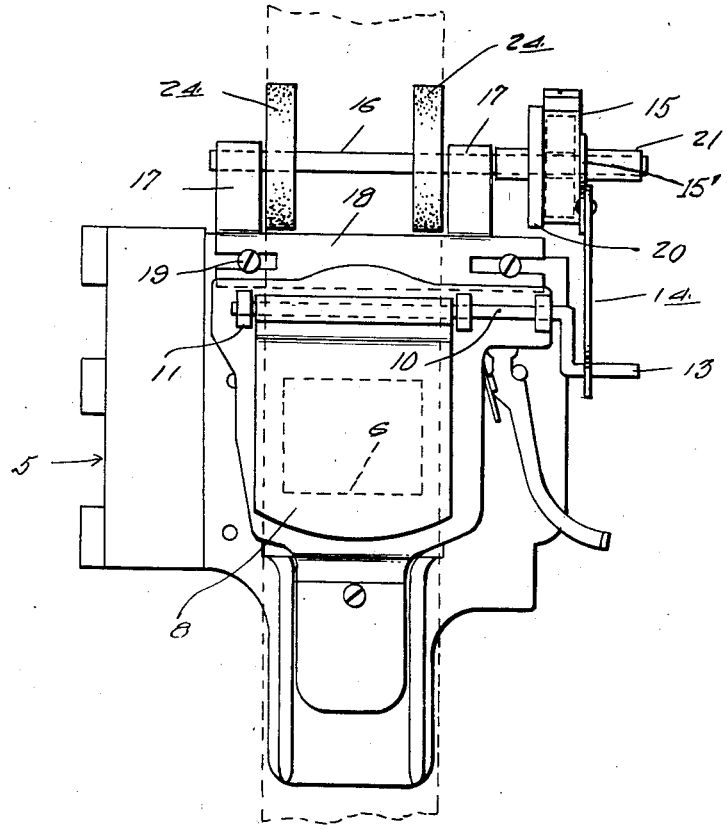
Figure 1 is a front elevational view illustrating the application of the invention to the door or gate of a Power's moving picture projection machine.

Referring to the drawings in detail it will be seen that 5 indicates generally the hinged door or gate of a Power's motion picture projecting machine, the same being provided with the usual opening 6 across which the film 7 is movable along tracks 8' provided therefor on the inside of the door.

The fire preventing device comprises in the present instance shaft 10 which is journalled in suitable bearing brackets 11 provided on the front side of the door 5 above the opening 6. By pressing the shutter 8 at one side thereof inwardly as at 12 the sleeve portion 9 is contracted about the shaft 10, and the shutter 8 thus secured to the shaft 10 for rotation therewith. At one end the shaft 10 is provided with a crank 13 that is connected through the medium of a link 14 with an arm 15' integral with or otherwise secured to one side of a drum 15.

Figure 3:
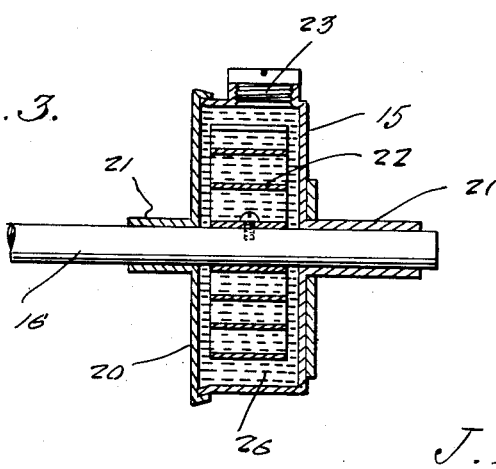
Figure 3 is a sectional view through a spring actuated drum forming part of the invention.

The drum 15 is mounted on a shaft 16 journalled in brackets 17 carried by a plate 18 secured as at 19 to the front of the door 5 above the shaft 10, when mounted on a Power's machine. A closure or end plate for the drum 15 is designated by the reference numeral 20, and said drum 15 and end plate 20 are provided with oppositely extending sleeves 21, the shaft 16 as shown in Figure 3 is supporting the drum 15 and the shaft rotates in the sleeves 21.

Arranged within the drum 15 is a spring 22, the center of which is wound tight on the shaft and secured to the shaft 16. Spring 22 is free of engagement with the drum 15 and operates in a bath of gummy or slow running grease or oil contained within the drum 15. In this connection it will be noted that the drum 15 is provided with a suitable filling neck and plug 23 therefor.

Figure 2:
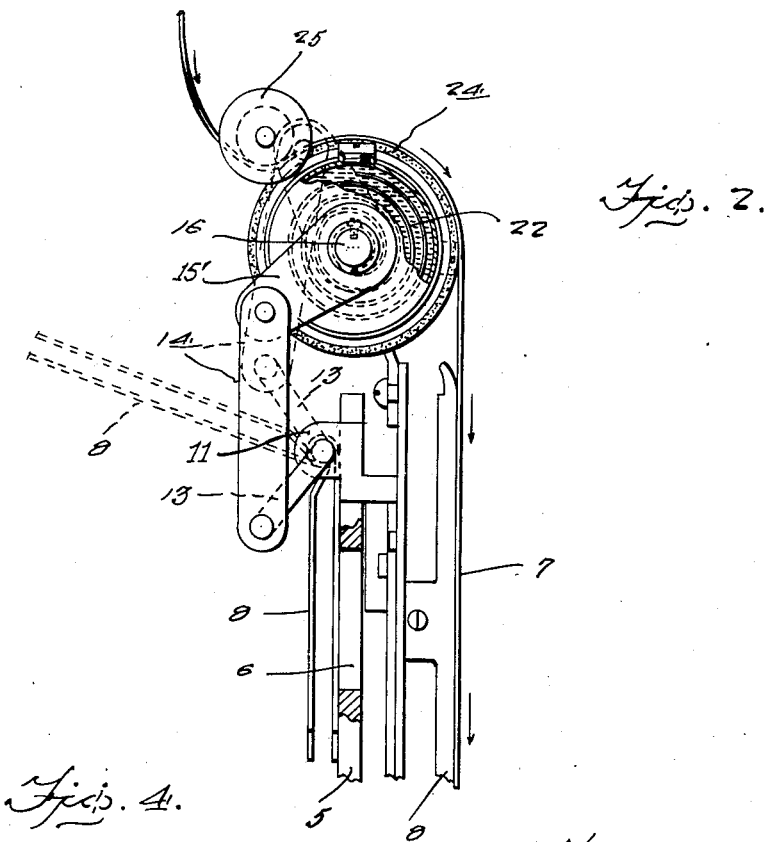
Figure 2 is a side elevational view with certain parts broken away and also illustrating the application of the invention to the door or gate of the machine.
Figure 4:
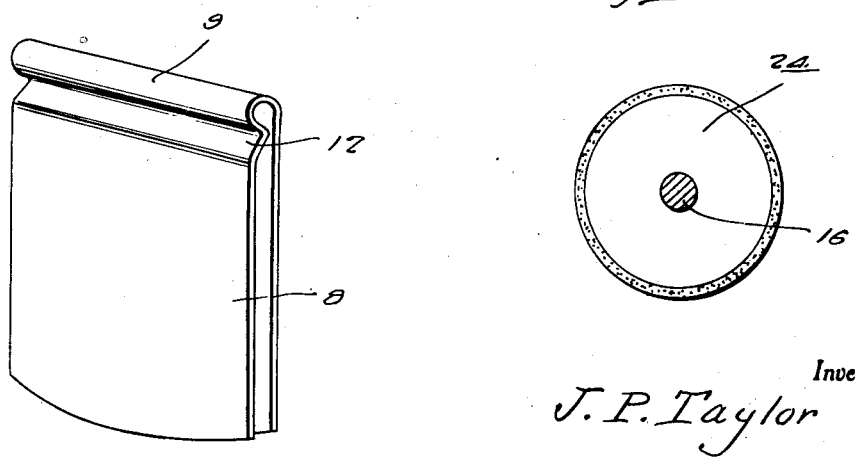
Figure 4 is a perspective view of the fire shutter.
Figure 5:
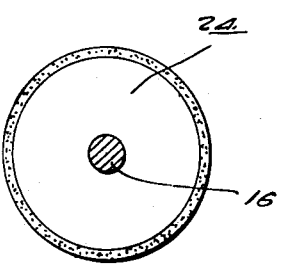
Figure 5 is a side elevational view of a roller with the shaft on which the roller is mounted shown in section.

Mounted on the shaft 16 to rotate therewith between the bearings 17 are rollers 24, 24 the peripheries of which are provided with a suitable friction surface and over which is trained the film strip 7, as said strip leaves the usual guide rollers 25 with which the projector machine is usually equipped and as will be clear from a study of Figures 1 and 2.

The utility and advantages of this invention will be apparent from the following.

As is well known the film is caused to move along the track 8' across the opening 6 by means of suitable mechanism including an intermittently operated sprocket, the film moving at about the rate of one frame or about three fourths of an inch at a time, or at the rate of about ninety feet per minute. It will thus be apparent that the rollers 24 turn intermittently. The spring 22 being tight on the shaft 16 will of course rotate with the rollers 24, but the outer end of the spring operating in the slow running grease or oil 26 within the drum 15 creates friction between the drum 15 and the spring 22 with a result that as the film 7 is jerked by the intermittent sprocket a winding of the spring is effected, while between such jerks the spring is unwinding and thus operating to hold the arm 5' up to the dotted line position shown in Figure 2 and consequently the shutter 8 in the dotted line position shown in Figure 2 in an out of the way position with respect to the opening 6 in the film door. Thus it will be apparent that the shutter 8 is held in the dotted line position shown in Figure 2 until such time as the film 7 stops moving properly in which event the shaft 16 and spring 22 will stop rotating, and therefore the friction caused by the rotating of spring 22 stops, and drum 15, link 14, shaft 10, fire shutter 8 and arm are all swung back to full line position by gravity as shown in Figure 2, thereby closing the opening and shutting projector light off from film 7.

Having thus described the invention, what I claim as new is:

1. In a motion picture machine, a gravity closed fire shutter, a member engaging a part of the film and actuated by the movement of the film, means operated by the movement of said member for holding the shutter in open position, such means including a shaft to which the member is connected, a coil spring having one end connected with the shaft, a drum rotatably supported on the shaft and enclosing the spring, the drum being free of the spring, and said drum being substantially full of thick lubricant.

2. In a motion picture machine, a gravity closed fire shutter, a rotatably supported shaft to which the shutter is connected, a crank on the shaft, a second shaft rotatably supported, a member on the second shaft engaging the film and actuated by the movement of the film, a drum rotatably supported by the second shaft, a crank connected with the drum, a link connecting the crank with the crank of the first shaft, and a coil spring located in the drum and having one end connected to the shaft and said drum containing a thick lubricant.

JOE P. TAYLOR.